United States Patent [19]

Harvey et al.

[11] Patent Number: 4,655,573
[45] Date of Patent: Apr. 7, 1987

[54] FILM WINDING ERROR PREVENTION APPARATUS

[75] Inventors: Frederick W. Harvey, Webster; Daniel M. Pagano, Henrietta, both of N.Y.

[73] Assignee: Eastman Kodak Company, Rochester, N.Y.

[21] Appl. No.: 837,627

[22] Filed: Mar. 10, 1986

[51] Int. Cl.⁴ .................. G03B 1/00; G03B 17/36
[52] U.S. Cl. ................................ 354/213; 354/217
[58] Field of Search .................. 354/204–207, 354/212–215, 217, 218

[56] References Cited

U.S. PATENT DOCUMENTS

| | | | |
|---|---|---|---|
| 2,226,161 | 12/1940 | Drotning | 354/204 |
| 3,406,621 | 10/1968 | Irwin | 354/212 |
| 3,641,897 | 2/1972 | Fujimoto | 354/204 |
| 4,134,657 | 1/1979 | Nomura | 354/218 X |
| 4,340,291 | 7/1982 | Berg | 354/215 |

FOREIGN PATENT DOCUMENTS 825483 12/1951 Fed. Rep. of Germany ...... 354/204

Primary Examiner—Donald A. Griffin
Attorney, Agent, or Firm—Roger A. Fields

[57] ABSTRACT

In a photographic camera, a manual wind member for rotating a take-up spool to wind a filmstrip into the spool is locked each time a fresh film frame is advanced to an exposure position and is unlocked automatically after the picture is taken. If however the filmstrip cannot be advanced in the camera because the film leader has failed to be wound onto the take-up spool, the manual wind member will not be locked, and therefore it can be actuated continuously to alert the photographer of such failure.

6 Claims, 4 Drawing Figures

FILM WINDING ERROR PREVENTION APPARATUS

BACKGROUND OF THE INVENTION

1. Field of the Invention

The invention relates generally to photographic cameras and in particular to those cameras having manual film winding means.

2. Description of the Prior Art

Typically, manual wind 35 mm cameras operate under the assumption that after a film cartridge is loaded in the camera and a rear door of the camera is closed a leader portion of the filmstrip will be wound onto a take-up spool inside the camera. Film winding is accomplished by rotating a manual wind knob or lever to rotate the take-up spool. When the filmstrip is advanced from the cartridge to the take-up spool, a film rewind crank engaging a supply spool inside the cartridge will be rotated in a direction opposite to the one for rewinding the exposed film into the cartridge. This provides some indication to the photographer that the leader portion is being wound onto the take-up spool. However, the indication is "passive" in that it requires the photographer to visually observe the reverse rotation of the rewind knob.

Other cameras include a colored indicator element which is rotated inside a window during film movement onto the take-up spool to indicate that the filmstrip is being advanced. Here again, however, the indication to the photographer is passive.

SUMMARY OF THE INVENTION

According to the invention, there is provided film winding error prevention apparatus which provides an "active" indication to the photographer that a leader portion of the filmstrip has failed to be wound onto a take-up spool in the camera. This is accomplished by allowing a manual wind member in the camera to be actuated continuously in the event of such failure, to actively inform the photographer of the failure. Conversely, in the absence of such failure the manual wind member is locked each time a fresh film frame is advanced to an exposure position and is unlocked automatically after the picture is taken.

Preferably, in the camera, a metering sprocket is initially coupled to the manually wind member to rotate the sprocket in response to actuation of the wind member, to enable at least a leader portion of the filmstrip to be wound onto the take-up spool. The metering sprocket is then uncoupled from the manual wind member to allow the sprocket to be rotated by film movement during further winding of the filmstrip onto the take-up spool as the wind member is actuated. When the metering sprocket is rotated by film movement to locate a first film frame in the exposure position, an arresting member is moved to lock the manual wind member. If however the filmstrip cannot be moved because the leader portion has failed to be wound onto the take-up spool, the manual wind member will not be locked, and therefore it can be rotated continuously to alert the photographer of such failure.

BRIEF DESCRIPTION OF THE DRAWINGS

The invention will be described in connection with the drawings, wherein.

DESCRIPTION OF THE PREFERRED EMBODIMENT

Figure 1:
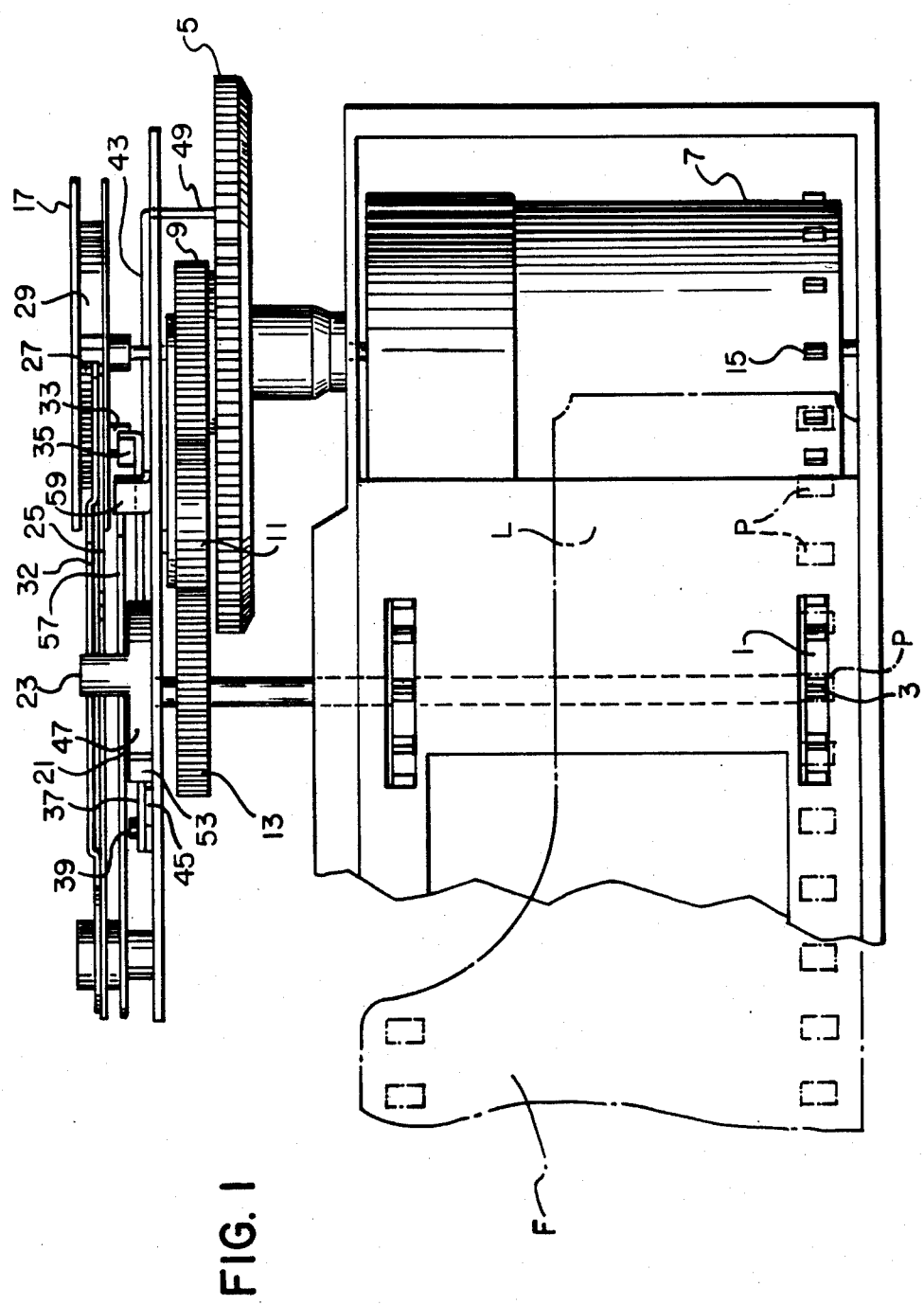
FIG. 1 is an elevation view of film winding error prevention apparatus for a manual wind 35 mm camera, according to a preferred embodiment of the invention.

The invention is disclosed as being embodied preferably in a manual wind 35 mm camera. Because the features of this type camera are well known, the description which follows is directed in particular to photographic elements forming part of or cooperating directly with the disclosed embodiment. It is to be understood however that other elements not specifically shown or described may take various forms known to persons of ordinary skill in the art.

In the type of camera to be described those photographic elements shown in the drawings will be assigned successive reference numbers. Other photographic elements now shown in the drawings are well known or conventional and will not be assigned any reference numbers. Thus, in the description which follows, the absence of a reference number in connection with a mentioned element indicates that such element is not shown in the drawings.

Figure 2:
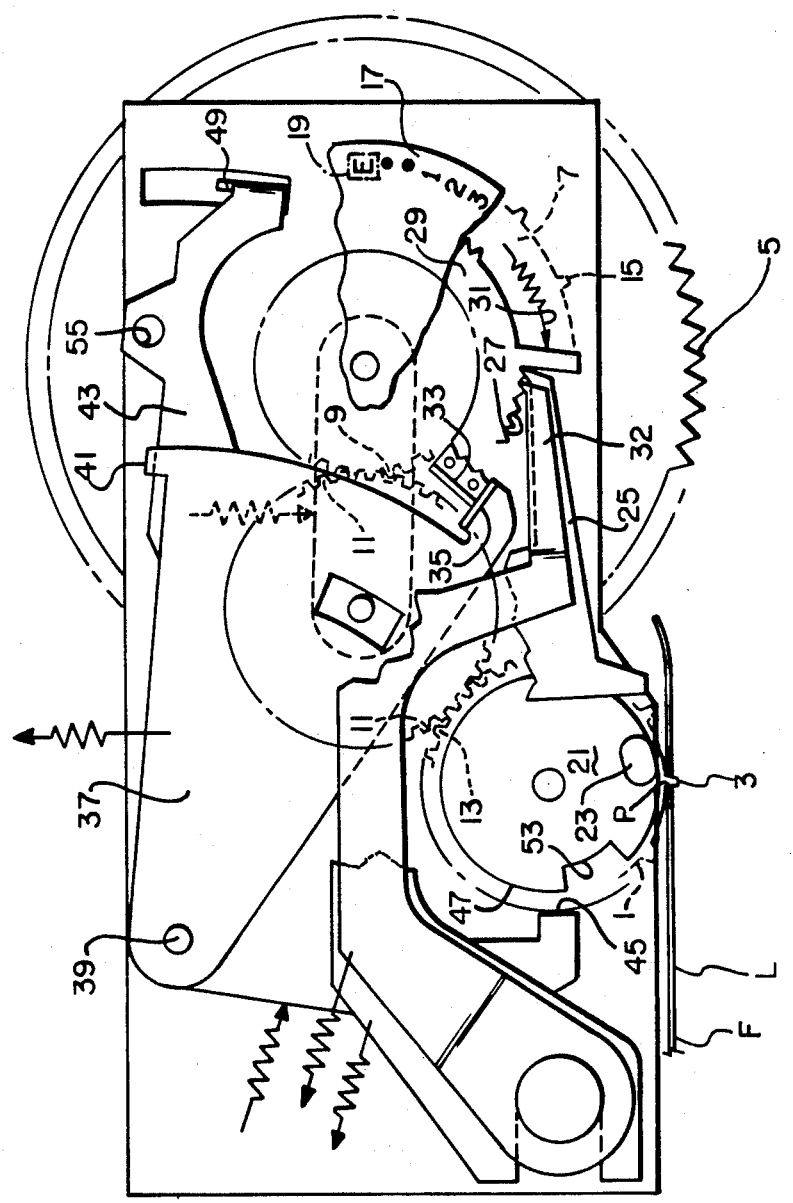
FIGS. 2, 3 and 4 are top plan views of the apparatus depicted in FIG. 1, illustrating the sequence of operation of the apparatus.

Referring now to the drawings and in particular to FIGS. 1 and 2, there is shown film winding error prevention apparatus in a manual wind 35 mm camera. When a conventional film cartridge is loaded in the camera, leading portion L of a filmstrip F extending out of the cartridge is placed over a metering sprocket 1 to position one or more perforations P in the film leader in engagement with respective teeth 3 on the metering sprocket. Then, a rear door of the camera is closed. Rotation of a manual wind knob or thumbwheel 5 rotates a take-up spool 7, coaxially fixed to the wind knob, and a drive gear 9, coaxially fixed to the wind knob. An intermediate gear 11 temporarily couples the drive gear 9 to a sprocket 13 to rotate the sprocket gear. The sprocket gear 13 is coaxially fixed to the metering sprocket 1 to rotate the metering sprocket, to advance the film leader L to the take-up spool 7. Respective teeth 15 on the take-up spool 7 engage successive perforations P in the film leader L to secure the leader to the spool, causing the leader to be wound onto the spool.

As shown in FIGS. 1 and 2, a counter indicia disk 17 has thirty-six evenly spaced settings represented by the numbers "1, 2, 3, . . . 36" imprinted on the indicia disk. These numbers correspond to successive unexposed frames on the filmstrip F. When a fresh film frame is located in an exposure position in the focal plane of a taking lens, the corresponding frame number on the counter indicia disk 17 will be visible in a window 19 at the top of the camera. An empty setting of the indicia disk 17 usually indicates that the camera is empty and is represented by the letter "E" imprinted on the indicia disk. Rotation of the metering sprocket 1 as described above causes a metering cam 21, coaxially fixed to the sprocket, to be rotated to move an integral camming post 23 on the metering cam against a counter incrementing member 25. Each time the metering sprocket 1 is rotated a single revolution, the incrementing member 25 is pushed to the right in FIGS. 2 and 3 to engage respective teeth 27 on a counter drive disk 29, coaxial fixed to the indicia disk 17. The indicia and drive disks 17 and 29 are thus rotated in opposition to the urging of a counter initializing spring 31 to increment the indicia disk from its "E" setting, shown in FIG. 2, to its "1" setting, shown in FIG. 3. To accomplish this incrementing of the indicia disk 17 from the "E" setting to the "1" setting, the metering sprocket 1 must be rotated three times. A stop member 32 engages one of the teeth 27 on the drive disk 29 to prevent the initializing spring 31 from returning the indicia disk 17 to its "E" setting.

By the time the counter indicia disk 17 is rotated to its first frame setting "1", the film leader L should be wound onto the take-up spool 7 and a retaining member 33 rotatable with the indicia disk will be rotated clear of a tab 35 on a wind-off lever 37. See FIG. 3. In turn, the wind-off lever 37 will be spring-urged to pivot in a counter-clockwise direction in FIG. 3 about a support pin 39 to cause the intermediate gear 11 to disengage from and the sprocket gear 13. As a result, continued rotation of the manual wind knob 5 will only rotate the take-up spool 7. The metering sprocket 1, then, can only be rotated by movement of the filmstrip F in engagement with the metering sprocket during further winding of the filmstrip F onto the take-up spool 7.

Figure 3:
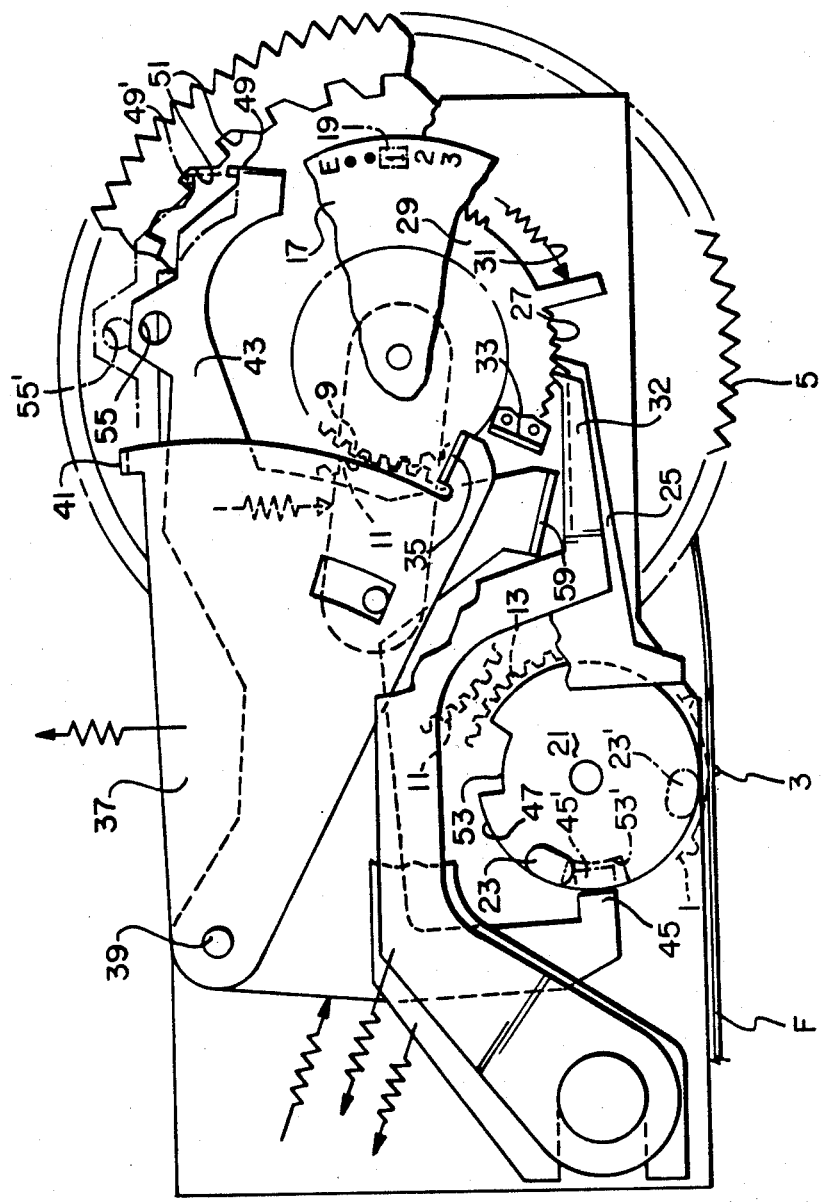

Pivoting of the wind-off lever 37 in the counter-clockwise direction in FIG. 3 about the support pin 39 moves a retaining member 41 to release an arresting lever 43. In turn, the arresting lever 43 will be spring-urged to pivot in a counter-clockwise direction in FIG. 3 about the support pin 39 until a first locking element 45 of the arresting lever comes to rest against a circumferential edge 47 of the metering cam 21 and a second locking element 49 of the arresting lever comes to rest slightly spaced from an annular array of successive cut-outs 51 along an inner side of the manual wind knob 5. Continued rotation of the wind knob 5 rotates the take-up spool 7 to further wind the filmstrip F onto the spool and to advance a first film frame to the exposure position, without rotating the counter indicia disk 17 from its first frame setting "1". The indicia disk 17 is not rotated from its first frame setting because the metering sprocket 1 will only be rotated approximately 90° by the filmstrip F before a recess 53 at the circumferential edge 47 of the metering cam 21 will be located opposite the first locking element 45, enabling the first locking element to enter the recess and secure the metering sprocket in place. See the phantom positions 45' and 53' of the first locking element 45 and the recess 53 in FIG. 3. At the same time, the camming post 23 on the metering cam 21 will come to rest in the phantom position 23' in FIG. 3, forward of the counter incrementing member 25. Thus, the camming post 23 will not yet be in position to push the incrementing member 25 to the right to change the frame setting of the indicia disk 17.

When the first locking element 45 of the arresting lever 43 enters the recess 53 to secure the metering sprocket 1 in place, the second locking element 49 of the arresting lever will engage one of the cut-outs 51 in the manual wind knob 5 to prevent continued rotation of the knob. See the phantom position 49' of the second locking element 49 in FIG. 3. At the same time, an opening 55 in the arresting lever 43 will be shifted to the phantom position 55' into alignment with a finger member depending from a shutter trigger button. This permits the trigger button to be manually depressed by allowing its finger member to enter the opening 55. Previously, the finger member was blocked by the arresting lever 43.

Figure 4:
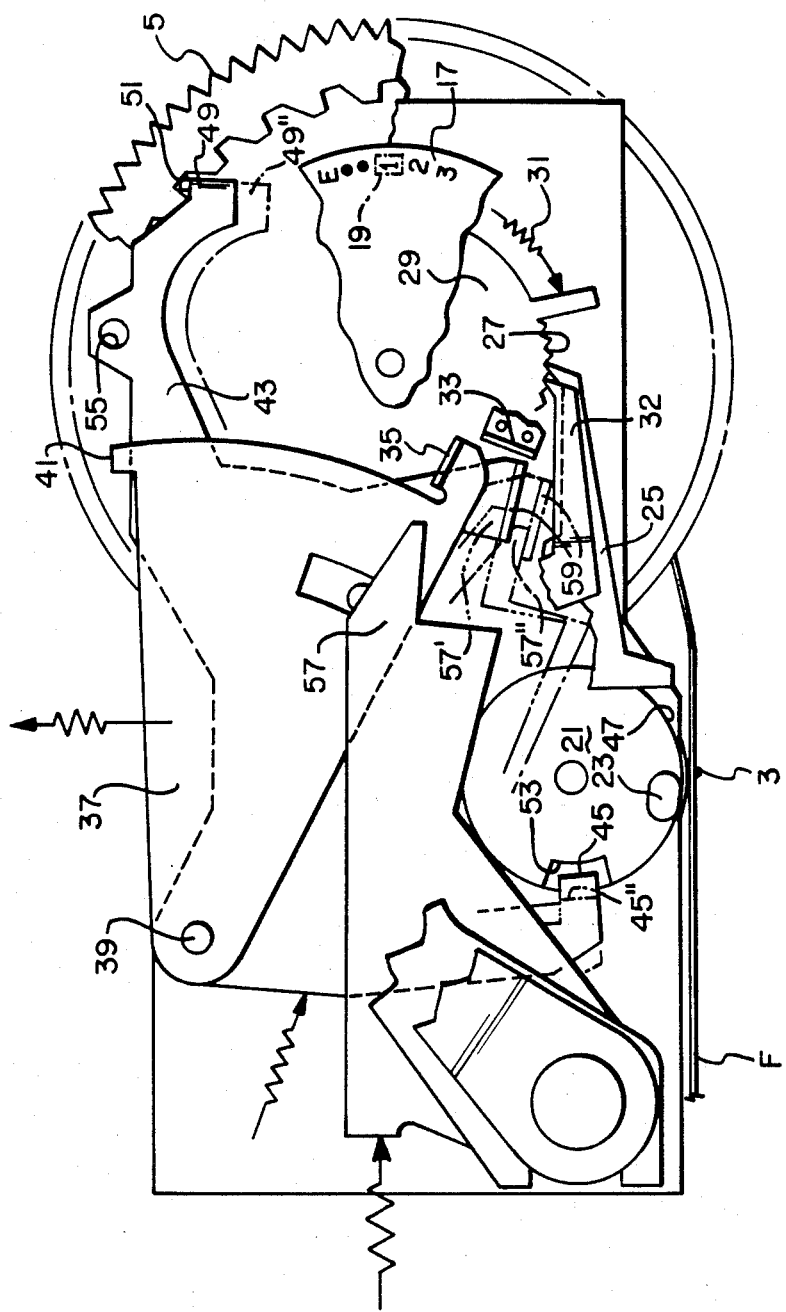

Manual depression of the shutter trigger button unlatches a high energy lever 57 which is spring-urged to actuate a shutter mechanism to take a picture. As shown in FIG. 4, the higher energy lever 57 moves to the phantom position 57' against a tab 59 on the arresting lever 43. However, the arresting lever 43 is held in place as long as the trigger button is depressed. Release of the trigger button permits the button to be spring-urged upwards to remove its finger member from the opening 55 in the arresting lever 43, allowing the high energy lever 57 to pivot the arresting lever in a clockwise direction in FIG. 4 about the support pin 39 to remove the first locking element 45 of the arresting lever from the recess 53 in the metering cam 21 and to separate the second locking element 49 of the arresting lever from one of the cut-outs 51 in the manual wind knob 5. As shown in FIG. 4, the first and second locking elements 45 and 49 come to rest in the phantom positions 45" and 49", and the high energy lever 57 comes to rest in the phantom position 57". Thus, the metering sprocket 1 and the manual wind knob 5 are again free to be rotated.

Renewed rotation of the manual wind knob 5 rotates the take-up spool 7 to again wind the filmstrip F onto the spool and to thereby rotate the metering sprocket 1. The high energy lever 57 is reset by movement of the camming post 23 on the metering cam 21 against the high energy lever. Then, the arresting lever 43 is spring-urged to relocate its first locking element 45 against the circumferential edge 47 of the metering cam 21 and to relocate its second locking element 49 slightly spaced from the array of cut-outs 51 in the manual wind knob, as shown in FIG. 3.

If the film leader L has failed to be wound onto the take-up spool 7 at the beginning of the film winding operation, the metering sprocket 1 will remain stationary during rotation of the manual wind knob 5 because the filmstrip F will not be advanced to drive the sprocket. Consequently, the manual wind knob 5 can not be locked by the second locking element 49 of the arresting lever 43, and therefore the knob can be rotated continuously without any effect. This, according to the invention, provides an active indication to the photographer that the film leader L has failed to be wound onto the take-up spool.

The invention has been described with reference to a preferred embodiment. However, it will be appreciated that variations and modifications can be effected within the ordinary skill in the art without departing from the scope of the invention.

We claim:

1. An improved photographic camera of the type wherein (a) a take-up spool is rotated to wind a filmstrip onto said spool and (b) a manual wind member is actuated to rotate said take-up spool, and wherein the improvement comprises:

means for performing an initial film winding operation to wind at least a leader portion of the filmstrip onto said take-up spool in response to actuation of said manual wind member; and means responsive to film movement during further winding of the filmstrip onto said take-up spool after the initial film winding operation has been completed for engaging said manual wind member to prevent continued actuation of the wind member, but in the event the initial film winding operation cannot be completed because the leader portion has failed to be wound onto said take-up spool allowing said manual wind member to be actuated continuously to alert the photographer of such failure.

2. An improved photographic camera of the type wherein (a) a take-up spool is rotated to wind a filmstrip onto said spool, (b) a manual wind member is actuated to rotate said take-up spool, and (c) a metering sprocket engages the filmstrip to be rotated in unison with movement of the filmstrip onto said take-up spool, and wherein the improvement comprises:

means first establishing a driving relation between said metering sprocket and said manual wind member for rotating the sprocket in response to actuation of the wind member to enable at least a leader portion of the filmstrip to be wound onto said take-up spool and then discontinuing the driving relation to allow said metering sprocket to be rotated by film movement during further winding of the filmstrip onto said take-up spool; and means responsive to said metering sprocket being rotated by film movement after the driving relation between the sprocket and said manual wind member is discontinued for engaging the wind member to prevent continued actuation of said wind member, whereby in the event the filmstrip cannot be moved to rotate said metering sprocket because the leader portion has failed to be wound onto said take-up spool said manual wind member can be actuated continuously to alert the photographer of such failure.

3. An improved photographic camera of the type wherein (a) a take-up spool is rotated to wind a filmstrip onto said spool in order to locate successive film frames in an exposure position, (b) a manual wind member is actuated to rotate said take-up spool, and (c) a metering sprocket engages the filmstrip to be rotated in unison with movement of the filmstrip onto said take-up spool, and wherein the inprovement comprises:

means first coupling said metering sprocket and said manual wind member for rotating the sprocket in response to actuation of the wind member to enable at least a leader portion of the filmstrip to be wound onto said take-up spool and then uncoupling said metering sprocket and said manual wind member for allowing the sprocket to be rotated by film movement to locate a first film frame in an exposure position during further winding of the filmstrip onto said take-up spool; and means responsive to said metering sprocket being rotated by film movement to locate the first film frame in the exposure position after the sprocket and said manual wind member are uncoupled for engaging the wind member to prevent continued actuation of said wind member, whereby in the event the filmstrip cannot be moved to rotate said metering sprocket because the leader portion has failed to be wound onto said take-up spool said manual wind member can be actuated continuously to alert the photographer of such failure.

4. An improved photographic camera of the type wherein (a) a take-up spool is rotated to wind a filmstrip onto said spool, (b) a manual wind member is actuated to rotate said take-up spool, (c) a metering sprocket engages the filmstrip to be rotated in unison with movement of the filmstrip onto said take-up spool, and (d) a frame counter for providing a count of the number of exposed or unexposed frames on the filmstrip is incremented to a successive frame setting in response to rotation of said metering sprocket to a predetermined angular position, and wherein the improvement comprises:

means first coupling said metering sprocket and said manual wind member for rotating the sprocket to its predetermined angular position in response to actuation of the wind member to increment said frame counter substantially to a first frame setting and then uncoupling said metering sprocket and said manual wind member for allowing the sprocket to be rotated to its predetermined angular position by film movement to increment said frame counter to the next frame setting; and means responsive to said metering sprocket being rotated less than to its predetermined angular position by film movement after the sprocket and said manual wind member are uncoupled for engaging the wind member to prevent continued actuation of said wind member, whereby in the event the filmstrip cannot be moved to rotate said metering sprocket because the filmstrip cannot be wound onto said take-up spool said manual wind member can be actuated continuously but said frame counter will not be incremented from its first frame setting.

5. An improved photographic camera of the type wherein (a) a take-up spool is rotated to wind a filmstrip onto said spool, (b) a manual wind knob is rotated to rotate said take-up spool, (c) a metering sprocket engages the filmstrip to be rotated in unison with movement of the filmstrip onto said take-up spool, and (d) a frame counter for providing a count of the number of exposed or unexposed frames on the filmstrip is incremented to a successive frame setting in response to rotation of said metering sprocket to a predetermined angular position, and wherein the improvement comprises:

motion transmission means having a drive mode for rotating said metering sprocket to enable at least a leader portion of the filmstrip to be wound onto said take-up spool in response to rotation of said manual wind knob and having an idle mode for allowing said metering sprocket to be rotated by film movement during further winding of the filmstrip onto said take-up spool in response to rotation of said manual wind knob;

means for changing said motion transmission means from its drive mode to its idle mode in response to said frame counter being incremented substantially to a first frame setting; and means responsive to said metering sprocket being rotated less than to its predetermined angular position by film movement after said motion transmission means is changed from its drive mode to its idle mode for engaging said manual wind knob to prevent continued rotation of the wind knob, whereby in the event the filmstrip cannot be moved to rotate said metering sprocket because the leader portion has failed to be wound onto said take-up spool said manual wind knob can be rotated continuously but said frame counter will not be incremented from its first frame setting.

6. The improvement as recited in claim 5, wherein said motion transmission means includes gear means biased to couple said manual wind knob and said metering sprocket during the drive mode and movable to uncouple the wind knob and the sprocket during the idle mode, and said mode changing means includes a wind-off lever biased to move said gear means to uncouple said manual wind knob and said metering sprocket and lever retaining means connected to said frame counter for releasing said wind-off lever to move said gear means in response to the counter being incremented to its first frame setting.

* * * * *